United States Patent
Hoffman et al.

(10) Patent No.: US 8,239,291 B2
(45) Date of Patent: Aug. 7, 2012

(54) SYSTEM AND METHOD FOR COMMUNICATING STATUS INFORMATION OF INVENTORY-RELATED TASKS USING A STATUS INDICATOR

(75) Inventors: Andrew E. Hoffman, Arlington, MA (US); Sean H. Breheny, Lexington, MA (US); Matthew D. Verminski, Somerville, MA (US); Michael C. Mountz, Cambridge, MA (US)

(73) Assignee: Kiva Systems, Inc., North Reading, MA (US)

( * ) Notice: Subject to any disclaimer, the term of this patent is extended or adjusted under 35 U.S.C. 154(b) by 913 days.

(21) Appl. No.: 11/620,515

(22) Filed: Jan. 5, 2007

(65) Prior Publication Data
US 2008/0167933 A1    Jul. 10, 2008

(51) Int. Cl.
*G06Q 10/00* (2006.01)
*G06F 7/00* (2006.01)
*A01K 5/02* (2006.01)

(52) U.S. Cl. ............ 705/28; 705/7.13; 705/29; 700/216
(58) Field of Classification Search .................... 705/28, 705/29, 7.13; 700/216
See application file for complete search history.

(56) References Cited

U.S. PATENT DOCUMENTS

| | | | | |
|---|---|---|---|---|
| 4,093,086 A * | 6/1978 | Lucas et al. ................. | 414/283 |
| 4,678,390 A * | 7/1987 | Bonneton et al. ........... | 414/282 |
| 5,228,820 A * | 7/1993 | Stansfield et al. .......... | 414/278 |
| 5,434,490 A * | 7/1995 | Ishida et al. ................ | 318/587 |
| 5,434,775 A * | 7/1995 | Sims et al. .................. | 705/7.12 |
| 5,636,966 A * | 6/1997 | Lyon et al. ................. | 414/791.6 |
| 5,664,113 A * | 9/1997 | Worger et al. .............. | 705/28 |
| 5,720,157 A * | 2/1998 | Ross ............................ | 53/445 |
| 5,733,098 A * | 3/1998 | Lyon et al. ................. | 414/802 |
| 5,875,434 A * | 2/1999 | Matsuoka et al. .......... | 705/28 |
| 6,011,998 A * | 1/2000 | Lichti et al. ................ | 700/230 |
| 6,061,607 A * | 5/2000 | Bradley et al. ............. | 700/216 |
| 6,208,908 B1 * | 3/2001 | Boyd et al. ................. | 700/216 |
| 6,505,093 B1 * | 1/2003 | Thatcher et al. ........... | 700/216 |
| 6,602,037 B2 * | 8/2003 | Winkler ...................... | 414/273 |
| 6,622,127 B1 * | 9/2003 | Klots et al. ................. | 705/28 |
| 6,948,023 B2 | 9/2005 | Huang et al. | |
| 6,964,371 B2 | 11/2005 | Huang et al. | |
| 6,975,914 B2 | 12/2005 | DeRemer et al. ........... | 700/96 |

(Continued)

FOREIGN PATENT DOCUMENTS

JP    2005-255390    3/2004

(Continued)

OTHER PUBLICATIONS

Vizoinal Announces Release of RFID-enabled Yard Management Solution; Vizional Yard RFID Delivers Visibility and Efficiencies to Yard Operations, Business Wire, Mar. 9, 2005.*

(Continued)

*Primary Examiner* — Scott Zare
(74) *Attorney, Agent, or Firm* — Baker Botts L.L.P.

(57) ABSTRACT

A method for communicating information pertaining to a task includes receiving wirelessly first status information. The first status information specifies a first status associated with a task. The method also includes indicating the first status to a user and receiving input from the user indicating a second status associated with the task. Additionally, the method includes transmitting wirelessly second status information to a remote device in response to receiving the input from the user. The second status information specifies the second status.

47 Claims, 3 Drawing Sheets

U.S. PATENT DOCUMENTS

| | | | |
|---|---|---|---|
| 7,139,637 B1* | 11/2006 | Waddington et al. | 700/216 |
| 7,516,848 B1* | 4/2009 | Shakes et al. | 209/34 |
| 7,591,630 B2* | 9/2009 | Lert, Jr. | 414/807 |
| 2002/0007300 A1* | 1/2002 | Slatter | 705/9 |
| 2003/0028410 A1* | 2/2003 | House et al. | 705/9 |
| 2003/0135300 A1* | 7/2003 | Lewis | 700/216 |
| 2003/0149585 A1* | 8/2003 | Foster et al. | 705/1 |
| 2005/0102203 A1* | 5/2005 | Keong | 705/28 |
| 2005/0174753 A1* | 8/2005 | Cao et al. | 362/106 |
| 2005/0198103 A1 | 9/2005 | Ching | 709/200 |
| 2005/0209902 A1* | 9/2005 | Iwasaki et al. | 705/8 |
| 2005/0238467 A1* | 10/2005 | Minges | 414/462 |
| 2006/0020909 A1 | 1/2006 | Pradhan | 717/101 |
| 2006/0106675 A1* | 5/2006 | Cohen et al. | 705/26 |
| 2006/0142895 A1* | 6/2006 | Waddington et al. | 700/216 |
| 2006/0206235 A1* | 9/2006 | Shakes et al. | 700/216 |
| 2006/0224459 A1* | 10/2006 | Aramaki et al. | 705/22 |
| 2007/0126578 A1* | 6/2007 | Broussard | 340/572.1 |
| 2007/0150383 A1* | 6/2007 | Shakes et al. | 705/29 |
| 2007/0185754 A1* | 8/2007 | Schmidt | 705/9 |
| 2007/0237610 A1* | 10/2007 | Uribe | 414/266 |
| 2008/0008568 A1* | 1/2008 | Harris et al. | 414/281 |
| 2009/0074545 A1* | 3/2009 | Lert et al. | 414/276 |
| 2009/0222129 A1* | 9/2009 | Waddington et al. | 700/216 |
| 2009/0224923 A1* | 9/2009 | Abraham et al. | 340/572.1 |
| 2010/0201490 A1 | 8/2010 | Huang et al. | |

FOREIGN PATENT DOCUMENTS

| | | |
|---|---|---|
| JP | 2005-263416 | 3/2004 |
| WO | WO 2006/098943 A1 | 3/2006 |

OTHER PUBLICATIONS

PCT Notification of Transmittal of the International Search Report and the Written Opinion of the International Searching Authority, or the Declaration with attached International Search Report and the Written Opinion of the International Searching Authority, dated Oct. 23, 2008, 8 pages.

European Patent Office Communication mailed Dec. 5, 2011 regarding Application No. 07865270.8-1238/2115620 PCT/US2007/0865795.

Japan Patent Office, Office Action for Application No. 2009-544865 and translation; 8 pages, Nov. 1, 2011.

Canadian Patent Office Communication mailed May 1, 2012 regarding Application No. 2,673,025; 4 pages, May 1, 2012.

* cited by examiner

SYSTEM AND METHOD FOR COMMUNICATING STATUS INFORMATION OF INVENTORY-RELATED TASKS USING A STATUS INDICATOR

TECHNICAL FIELD OF THE INVENTION

This invention relates in general to task management and, more particularly, to a method and system for communicating status information relating to tasks performed within an inventory system.

BACKGROUND OF THE INVENTION

Technological advancements have made an ever-increasing amount of automation possible in inventory-handling and other types of material-handling systems. As automation increases, human operators become responsible for a decreasing portion of the tasks performed within such systems. This reduced reliance on human effort may, in turn, provide significant advantages in speed, throughput, and productivity. Nonetheless, in such systems, it may be necessary for human operators to interface with the automated elements of the system, and interaction between the human operator and automated elements of the system may limit the overall speed and effectiveness of the system.

SUMMARY OF THE INVENTION

In accordance with the present invention, the disadvantages and problems associated with completing tasks within, for example, an inventory storage system have been substantially reduced or eliminated. In particular, a status indicator is provided that facilitates the communication of status information between a user completing tasks and a management module assigning and/or monitoring the tasks.

In accordance with one embodiment of the present invention, a method for communicating information pertaining to a task includes receiving wirelessly first status information. The first status information specifies a first status associated with a task. The method also includes indicating the first status to a user and receiving input from the user indicating a second status associated with the task. Additionally, the method includes transmitting wirelessly second status information to a remote device in response to receiving the input from the user. The second status information specifies the second status.

In accordance with another embodiment of the present invention, a system for completing tasks includes a management module and a plurality of status indicators. The management module is capable of wirelessly transmitting status information to and wirelessly receiving status information from the plurality of status indicators. Additionally, the plurality of status indicators includes a first status indicator that is capable of wirelessly receiving first status information from the management module. The first status information specifies a first status associated with a task. The first status indicator is further capable of indicating the first status to a user and receive input from the user indicating a second status associated with the task. Furthermore, the first status indicator is capable of wirelessly transmitting second status information to the management module in response to receiving the input. The second status information specifies the second status.

Technical advantages of certain embodiments of the present invention include an efficient mechanism for interfacing human and automated components for purposes of task management. Other technical advantages of certain embodiments of the present invention include a flexible and scalable system for task management that can easily be adapted to incorporate changes in infrastructure and personnel. Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
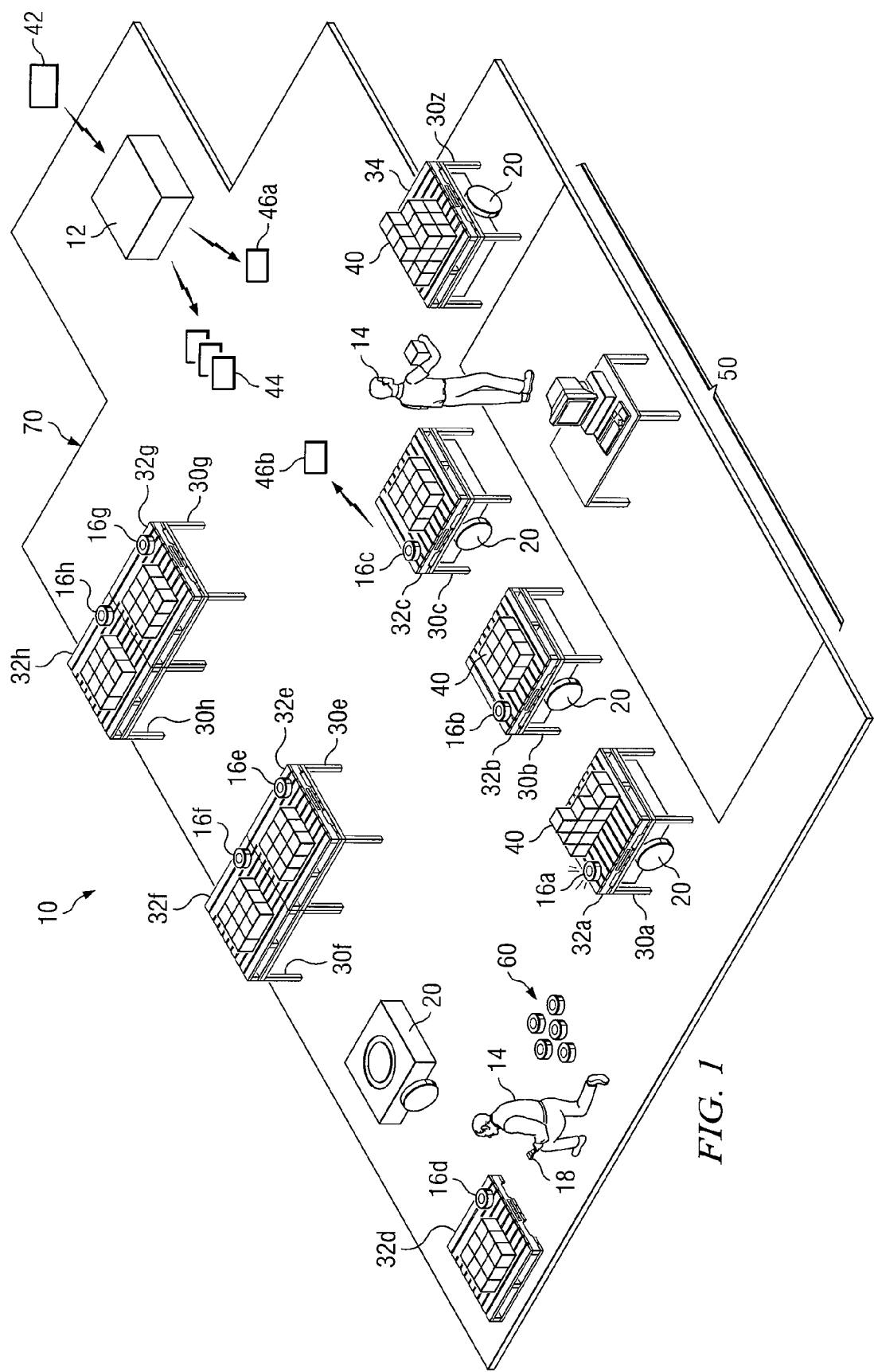
FIG. 1 illustrates an inventory handling system.

FIG. 1 illustrates a particular embodiment of an inventory system 10 that stores and retrieves inventory items 40 for purposes of satisfying inventory requests received or generated by inventory system 10. The embodiment of inventory system 10 illustrated in FIG. 1 includes a management module 12, a user 14, a plurality of status indicators 16, one or more mobile drive units 20, one or more inventory holders 30, one or more inventory stations 50, and one or more status indicators 16. These elements interoperate within inventory system 10 to complete various tasks related to a plurality of inventory items 40 that are received by and/or stored in inventory system 10. Status indicators 16 allow user 14 and management module 12 to exchange information relating to the status of these tasks. Although FIG. 1 illustrates, for purposes of example, a particular type of system in which the use of status indicators 16 may provide benefits, status indicators 16 may be employed in any appropriate type of system in which tasks are completed.

Management module 12 assigns tasks to appropriate components of inventory system 10 and coordinates operation of the various components in completing the tasks. These tasks may relate not only to the movement and processing of inventory items 40, but also to the management and maintenance of the components of inventory system 10. Management module 12 may select particular components of inventory system 10 to perform these tasks and communicate appropriate commands and/or data to the selected components to facilitate completion of these operations. Although shown in FIG. 1 as a single, discrete component, management module 12 may represent multiple components. For example, management module 12 may represent or include portions of mobile drive units 20 or other elements of inventory system 10. As a result, any or all of the interaction between management module 12 and a particular mobile drive unit 20, inventory station 50, or other component that is described below may, in particular embodiments, represent peer-to-peer communication between that component and other similar components in inventory system 10.

User 14 represents, in particular embodiments, a human operator of inventory system 10 or an operator of particular elements of inventory system 10, such as inventory station 50. User 14 performs tasks involving inventory items 40 such as picking inventory items 40 stored in inventory system 10 and replenishing inventory items 40 in inventory system 10. Although the description below focuses on embodiments of inventory system 10 in which user 14 represents a human, user 14 may represent a robot or other automated components capable of completing tasks involving inventory items 40 and interacting with management module 12 through status indicators 16.

Status indicators 16 allow management module 12 and user 14 to exchange information pertaining to tasks performed in inventory system 10 such as, for example, the tasks performed by a user 14 at inventory station 50. Status indicators 16 are capable of receiving input from users 14 regarding the status of a task and communicating this information to management module 12. Status indicators 16 may include any appropriate buttons, keys, switches, microphones, touch screens, and/or other suitable interface components to allow the user to input information to status indicators 16. Status indicators 16 are also capable of receiving information from management module 12 relating to the status of the task and providing this information to users 14. Status indicators 16 may include displays, speakers, lights, screens, and/or other suitable interface components to allow status indicators 16 to convey information received from management module 12 to users 14. In general, status indicators 16 may include any appropriate combination of hardware and/or software suitable to provide the described functionality. The contents of a particular embodiment of status indicator 16 are described in greater detail below with respect to FIG. 2.

In particular embodiments, status indicators 16 are portable devices capable of wireless communication with management module 12. As a result, status indicators 16 may be placed on or near objects or locations involved in a particular task. For example, in particular embodiments, a status indicator 16 may be placed on a pallet of inventory items 40 to be processed as part of a task associated with that status indicator 16. Additionally, in particular embodiments, status indicator 16 may be clipped, magnetically coupled, or otherwise attached to objects involved in the relevant task.

Additionally, in particular embodiments, status indicators 16 may be dynamically associated with particular tasks, system components, other objects, locations, and/or users 14. For example, as new components are added to or removed from inventory system 10, status indicators 16 may be assigned to tasks involving these new components. In such embodiments, inventory system 10 may utilize any appropriate techniques to create and maintain these associations, as discussed in greater detail below. As a result, inventory system 10 may include status indicators 16 that are not presently associated with any objects and/or tasks, as illustrated by unassigned status indicators 60 in FIG. 1. Moreover, status indicators 16 may be associated with an object and/or task at an appropriate time, disassociated from the object and/or task after one or more relevant tasks have been completed, and then associated with another object and/or task. Thus, in particular embodiments, inventory system 10 may recycle status indicators 16, thereby limiting the number of status indicators 16 needed during operation of inventory system 10.

In addition to management module 12, users 14, and status indicators 16, inventory system 10 may also include a number of components that are directly or indirectly controlled or managed by management module 12 to assist user 16 in completing tasks. Consequently, a portion of the work necessary to fulfill orders 42 is automated. As examples of such components, the embodiment of inventory system 10 illustrated in FIG. 1 includes mobile drive units 20, inventory holders 30, and inventory station 50.

More specifically, mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. In alternative embodiments, mobile drive units 20 represent elements of a tracked inventory system 10 configured to move inventory holders 30 along tracks, rails, cables, crane system, or other guidance or support elements traversing workspace 70.

Additionally, mobile drive units 20 may be capable of communicating with management module 12 to receive information identifying selected inventory holders 30, transmit the locations of mobile drive units 20, or exchange any other suitable information to be used by management module 12 or mobile drive units 20 during operation. Mobile drive units 20 may communicate with management module 12 wirelessly, using wired connections between mobile drive units 20 and management module 12, and/or in any other appropriate manner. In general, mobile drive units 20 may be powered, propelled, and controlled in any manner appropriate based on the configuration and characteristics of inventory system 10.

Inventory holders 30 store inventory items 40 or hold containers that themselves store inventory items 40. Inventory holders 30 may include suitable components to allow inventory holders 30 to dock with or couple to mobile drive units 20 and are capable of being carried, rolled, and/or otherwise moved by mobile drive units 20. In the illustrated embodiment, inventory holder 30 hold or support storage pallets 32 and shipping pallets 34 on which inventory items 40 are stored. In alternative embodiments, inventory holders 30 may represent modular holders that include one or more bins each capable of storing inventory items 40. More generally, however, inventory holders 30 may represent any suitable components capable of storing inventory items 40 in any appropriate manner.

Storage pallets 32 and shipping pallets 34 store, hold, and/or support inventory items 40. As noted above, storage pallets 32 and shipping pallets 34 may rest on or be supported by inventory holders 30 while stored in inventory system 10. Such inventory holders 30 may be configured to dock with and be transported by mobile drive units 20. In particular embodiments, storage pallets 32 and shipping pallets 34 represent conventional wooden pallets on which inventory items 40 may rest. In alternative embodiments, storage pallets 32 and shipping pallets 34 may represent storage containers custom-designed for use in inventory system 10.

Inventory items 40 represent any objects suitable for storage, retrieval, and/or processing in an automated inventory system 10. As one example, inventory system 10 may represent a mail order warehouse facility, and inventory items 40 may represent merchandise stored in the warehouse facility. As another example, inventory system 10 may represent a merchandise-return facility, and inventory items 40 may represent merchandise returned by customers. As yet another example, inventory system 10 may represent a manufacturing facility, and inventory items 40 may represent individual components of a manufacturing kit to be assembled into a finished product, such as electronic components for a customized computer system.

Inventory station 50 represents locations designated for the completion of particular tasks involving inventory items 40. Such tasks may include the removal of inventory items 40 from pallets 32, the storage of inventory items 40 on pallets 32, the counting of inventory items 40 on pallets 32 or 34, the decomposition of inventory items 40 (e.g. from pallet- or case-sized groups to individual inventory items 40), and/or the processing or handling of inventory items 40 in any other suitable manner. In particular embodiments, inventory stations 50 may merely represent the physical locations where a particular task involving inventory items 40 can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 12, and/or any other suitable components.

In operation, inventory system 10 stores inventory items 40, and various components of inventory system 10 complete tasks involving inventory items 40. As part of this operation, management module 12 may select the appropriate components to complete particular tasks and transmit task assignments 44 to the selected components to trigger completion of the relevant tasks. Each task assignment 44 defines, describes, and/or identifies one or more tasks to be completed by a particular component. These tasks may relate to the retrieval, storage, replenishment, and counting of inventory items and/or the management of components of inventory system 10. Although task assignments 44 may represent any appropriate information communicated to the relevant component in any suitable manner, in particular embodiments, task assignments 44 each represent one or more packets transmitted to the relevant components in accordance with an appropriate wireless communication standard.

The tasks associated with task assignments 44 may include tasks to be performed by user 14 at inventory station 50. For example, user 14 may operate an inventory station 50 and processes inventory items 40 to complete tasks assigned user 14 and/or inventory station 50. While completing these tasks user 14 receives information from management module 12 through status indicators 16 relating to the status of one or more tasks assigned to user 14. For example, management module 12 may transmit information indicating that user 14 should begin a certain task associated with status indicator 16.

While completing these tasks user 14 also provides input to status indicators 16 and, based on this input, status indicators 16 transmit back to management module 12 information relating to the status of the relevant tasks. For example, user 14 may provide input to a particular status indicator 16 indicating that a corresponding task has been completed and the status indicator 16 may then transmit this information to management module 12.

To illustrate one example of how status indicators 16 might be used in a particular embodiment of inventory system 10, FIG. 1 shows an embodiment of inventory system 10 that includes inventory holders 30a-h, each containing or supporting a storage pallet 32 that holds a plurality of inventory items 40. Also shown in FIG. 1 is holder 30z, which contains or supports a shipping pallet 34. In this example, man receives an order 42 that specifies a plurality of inventory items 40 to be shipped to a specific destination. User 14 is responsible for transferring inventory items 40 from storage pallets 32 to smaller groups 34 on a shipping pallet 34. Thus, in this example embodiment, inventory system 10 may receive pallets of inventory items 40 grouped by inventory item 40. User 14 may then be responsible for transferring inventory items 40 from such storage pallets 32 on which inventory items 40 are grouped according to item type to shipping pallets 34 on which inventory items 40 are grouped according to a delivery destination associated with these inventory items 40.

To facilitate this process, inventory system 10 may associate a status indicator 16 with individual inventory items 40 or groups of inventory items 40 as discussed above. User 14 may form the associations between status indicators 16 and inventory items 40 in any suitable manner based on the configuration and capabilities of status indicators 16 and inventory system 10. In particular embodiments, management module 12 or other components of inventory system 10 may maintain these associations in memory and use the associations to communicate with appropriate status indicators 16.

As one example, in particular embodiments, inventory items 40, storage pallets 32, and status indicators 16 may all include identifiers that uniquely identify them. These identifiers may represent alphanumeric labels, colored tags, bar codes, radio frequency identifier (RFID) tags, or any other suitable from of identifiers. When inventory items 40 are added to inventory system (e.g., when a delivery of inventory items 40 arrives), user 14 may transmit information identifying the new inventory items 40, a storage pallet 32 on which the new inventory items 40 will be stored, and a selected status indicator 16 to management module 12. Depending on the type of identifiers used and the configuration of inventory system 10, user 14 may input this information manually, use identifier reader 18 to capture and transmit the relevant information, or provide the information to management module 12 in any other appropriate manner. Management module 12 then associates the new inventory items 40, the storage pallet 32 on which they are stored, and the selected status indicator 16 in a data structure in memory. As a result, management module 12 may maintain a database or other data structure that associates all storage pallets 32 in inventory system 10 with the inventory items 40 stored on that storage pallet 32. After reading the appropriate identifiers, user 14 may also place the selected status indicator 16 on top of the associated storage pallet 32, as shown in FIG. 1, so that the selected status indicator 16 moves with the relevant storage pallet 32.

As another example, user 14 may use information transmitted by status indicators 16 themselves to assist management module 12 in generating these associations. In particular embodiments, management module 12 may prompt user 14 to select a particular status indicator to associate with the relevant inventory items 40, and user 14 may instruct a selected status indicator 16 to identify itself to management module 12. For example, management module 12 may broadcast an instruction to all or a select subset of unassigned status indicators 60 operational in inventory system 10 instructing each status indicator 16 to indicate its availability to a user 14, such as by activating a light on that status indicator 16. User 14 may then select one of the available status indicators 16 and instruct the selected status indicator 16 (e.g., by pushing a button on the selected status indicator 16) to transmit information identifying the selected status indicator 16 to management module 12. The selected status indicator 16 may then transmit information identifying the selected status indicator 16, such as an alphanumeric value, to management module 12. Management module 12 may then associate that identifying information with the relevant inventory items 40, and operation may proceed as described above.

Additionally, management module 12 may evaluate various characteristics of status indicator 16 before associating status indicator 16 with particular tasks or objects. This status may relate to the power level of status indicator 16, the signal quality currently experienced by status indicator 16, whether status indicator 16 is currently associated with a task or object, the status of the task to status indicator 16 is currently assigned, and/or any other appropriate characteristic of status indicator 16 or its operation. If management module 12 determines that the state and/or capabilities of status indicator 16 is not appropriate for assigning to tasks or object or to the particular task or object to which user 14 is attempting to assign status indicator 16, management module 12 may reject the selected status indicator 16. Management module 12 may then prompt user 14 to select a different status indicator for the relevant task or object. For example, management module 12 may activate a light on identifier reader 18 that indicates the scanned indicator identifier has been rejected and user 14 should scan another status indicator 16. As a result, management module 12 may maintain information regarding the state of status indicators 16 or may request such information from status indicators 16 themselves at appropriate times to determine the relevant state.

For example, when user 14 attempts to associate a particular status indicator 16 to a task or object, management module 12 may query the selected status indicator 16 to determine whether the power level is sufficient to complete the associated task. The selected status indicator 16 may then communicate its power level to management module 12. If management module 12 determines that the power level is too low for the selected status indicator 16 to be associated with the relevant task, management module 12 may prompt user 14 to select a different status indicator 16.

In the illustrated example, once the inventory items 40 and/or storage pallets 32 stored in inventory system 10 are associated with status indicators 16, management module 12 may assign tasks to user 14 and various components of inventory system 10 to facilitate the completion of orders 42 received or generated by inventory system 10. For example, management module 12 may receive an order 42 for a collection of different types of inventory items 40 to be delivered to a particular destination, such as a retail store that sells inventory items 40. Management module 12 may then identify one or more storage pallets 32 on which the requested inventory items 40 are stored based on the associations stored in the data structure. Based on this information, management module 12 manages the operation of inventory system 10 in creating a shipping pallet 34 containing the requested collection of inventory items 40. The created shipping pallet 34 may then be delivered to the retail store that placed order 42.

As part of managing the creation of shipping pallet 34, management module 12 may generate one or more task assignments 44 that each specify, describe, and/or initiate a task involved in the creation of the requested shipping pallet 34. Management module 12 may then transmit the task assignment 44 to an appropriate element or party within inventory system 10. For example, in particular embodiments, management module 12 may generate one or more task assignments 44 specifying storage pallets 32 (storage pallets 32a-c in the illustrated example) that hold inventory items 40 to be moved to inventory station 50. Management module 12 then transmits the generated task assignments 44 to appropriate components of inventory system 10, such as selected mobile drive units 20, to request the transport of the appropriate storage pallets 32 to inventory station 50. As a result, a selected set of mobile drive units 20 may move to the inventory holders 30 holding the identified storage pallets 32 and dock with these inventory holders 30. The selected set of mobile drive units 20 may then move the relevant inventory holders 30 to inventory station 50 as shown in FIG. 1.

After mobile drive units 20 bring the appropriate storage pallets 32 to inventory station 50, user 14 may then begin a number of tasks related to the creation of shipping pallet 34. Status indicators 16 allow user 14 and management module 12 to exchange status information relating to the status of these tasks. More specifically, each status indicator 16 may be associated with a predetermined task and/or a component involved in a predetermined task and may facilitate the exchange of status information related to that task.

For example, in particular embodiments, the order 42 being filled by inventory system 10 may request multiple different inventory items 40 and user 14 is assigned multiple tasks relating to the creation of a suitable shipping pallet 34 that satisfies order 42. Each of these tasks involves transferring a particular inventory item 40 requested by the order 42 from a storage pallet 32 storing the inventory item 40 to the shipping pallet 34 associated with order 42. In such embodiments, a status indicator 16 associated with each of the storage pallets 32 facilitates the exchange of information between user 14 and management module 12 relating to the transfer of inventory items 40 from that storage pallet 32 to the shipping pallet 34. Management module 12 may transmit status information 46a to each of these status indicators 16 indicating that user 14 has a task to complete involving inventory items 40 or pallets 32 or 34 associated with the status indicator 16.

The relevant status indicators 16 may then communicate the received status information 46a to user 14. Status information 46a provided by status indicators 16 to user 14 may indicate that all or a portion of the associated task has yet to be completed, instruct the user 14 to start or finish the associated task, specify parameters of the task to be completed, and/or provide any other appropriate form of information relating to the status of the corresponding task. Furthermore, status indicator 16 may receive status information 46a conveyed to user 14 from management module 12 directly (e.g., as part of a task assignment 44 received from management module 12) or may itself generate status information 46a from other information received from management module 12.

For example, at an appropriate point after mobile drive units 20 move storage pallets 32a-c to inventory station 50, each of the status indicators 16 associated with storage pallets 32a-c (i.e., status indicators 16a-c) indicates to user 14 that a task involving that storage pallet 32 is ready to be completed and/or additional status information relating to the task. In particular embodiments, this may involve activating a light, sound generator, or other sensory feedback component to instruct user 14 to take an inventory item 40 from the associated storage pallet 32 and move it to the shipping pallet 34. In alternative embodiments, status indicators 16 may provide additional status information 46a including a quantity of inventory items 40 to move to shipping pallet 34 from the associated storage pallet 32 or a priority level for each of the tasks associated with storage pallets 32a-c.

In addition to receiving status information 46 from management module 12 through status indicators 16a-c, user 14 may also provide input to status indicators 16a-c, and status indicators 16a-c transmit status information 46 back to management module 12 based on this input. Status information 46 transmitted by status indicators 16a-c to management module 12 may indicate that all or a portion of the associated task has been completed, indicate that user 14 has begun the task, specify the manner in which user 14 is completing the task, and/or provide any other appropriate form of information relating to the status of the corresponding task.

For example, in the illustrated example, as user 14 transfers an inventory item 40 requested in the order 42 from storage pallet 32a to shipping pallet 34, user 14 may provide input to the status indicator 16 associated with shipping pallet 34 (i.e., status indicator 16a) indicating that user 14 moved an inventory item 40 from storage pallet 32a to shipping pallet 34. In particular embodiments, user 14 may input this information by pressing a button on the relevant status indicator 16, flipping a switch on the status indicator 16, or speaking into a microphone of status indicator 16 to indicate that an inventory item 40 has been moved from the associated storage pallet 32. Thus, as user 14 moves an inventory item 40 from storage pallet 32a to shipping pallet 34, user 14 may press a button on status indicator 16a to inform status indicator 16a that user 14 has transferred one of the inventory items 40. Status indicator 16 may then communicate status information 46b to management module 12 indicating that user 14 has moved an inventory item 40 from storage pallet 32a to shipping pallet 34.

Consequently, status indicators 16 can provide an effective interface to allow management module 12 to instruct user 14 on tasks to be completed and user 14 to inform management module 12 on the user's progress in completing those tasks. Furthermore, based on the user's progress, management module 12 may generate additional task assignments 44 for tasks that depend upon completion of the tasks currently assigned to user 14. For example, in particular embodiments, only a limited number of storage pallets 32 can be positioned within reach of user 14 at a particular time. Thus, as user 14 indicates to management module 12 (through status indicators 16) that user 14 has completed tasks associated with certain storage pallets 32, management module 12 may generate appropriate task assignments 44 for mobile drive units 20 to return those storage pallets 32 to storage and move other storage pallets 32 closer to user 14.

Additionally, when user 14 indicates that user 14 has completed the last task associated with the current order, management module 12 may initiate other tasks necessary to complete order 42. For example, management module 12 may generate and transmit a task assignment 44 to the mobile drive unit 20 holding shipping pallet 34 that instructs that mobile drive unit 20 to move shipping pallet 34 to a storage location, another location (e.g., another inventory station 50) where shipping pallet 34 can be prepared for shipping, or a shipping dock where shipping pallet 34 can be loaded onto a truck or other form of transportation for delivery to a destination specified by order 42.

Furthermore, status indicators 16 may, in particular embodiments, be associated with a particular inventory item 40, shipping pallet 34, or other component throughout the completion of multiple different tasks involving that inventory item 40 or component. Moreover, these tasks may be intended for completion at various different locations within workspace 70. As a result, a particular status indicator 16 may be assigned to a particular inventory item 40 or other object and then follow that object as the object is moved around workspace 70. The assigned status indicator 16 may then facilitate the exchange of status information for several tasks involving the relevant component that are performed at various different locations.

For example, a collection of inventory items 40 may be transported to a first station after being associated with a status indicator 16. At the first station, the associated status indicator 16 may indicate to an operator of the first station that a first task should be completed with respect to the inventory items 40. This first task may be predetermined or indicated to the operator by status indicator 16 and/or other components of inventory system 10. Using the associated status indicator 16, the operator may then indicate completion of the first task to management module 12. Then, the inventory items 40 may be transported to a second station. At the second station, the associated status indicator 16 may indicate to another operator that a second task should be completed with respect to the inventory items 40. Using the associated status indicator 16, the second operator may then indicate completion of the second task to management module 12. In particular embodiments, this process may be repeated as a series of tasks involving the associated inventory items 40 are completed at various locations in inventory system 10.

As a result, status information 46 communicated between user 14 and management module 12 through status indicators 16 can streamline the exchange of information between the manual and automated portions of inventory system 10 and, thus, may improve the efficiency and throughput provided by inventory system 10. In particular, status indicators 16 may allow management module 12 to initiate an ordered sequence of tasks and manage the completion of tasks that rely on both automated and human effort. Additionally, because status indicators 16 can, in particular embodiments, be dynamically associated with particular storage pallets 32 and/or tasks, the interface system provided by status indicators 16 is flexible and can easily be adapted to handle new storage pallets 32 and/or tasks. Moreover, because particular embodiments of status indicators 16 are configured for wireless communication with management module 12, such status indicators 16 can be easily moved or repositioned to allow for easy access by user 14 and/or to collocate status indicators 16 with associated components of inventory system 10 (e.g., storage pallets 32).

Although the illustrated example utilizes status indicators 16 that are configured for use with particular types of tasks, status indicators 16 can be used to communicate status information 46 for any appropriate type of tasks that may be performed in inventory system 10. In addition, while FIG. 1 and the above description focus on particular embodiments of status indicator 16 that are used in an inventory system, status indicators 16 may also be used in other types of systems in which tasks are performed and status information 46 pertaining to those tasks is shared between various components of the system.

As one example, particular embodiments of status indicators 16 may be used in an airport luggage facility in which particular pieces of luggage may be selected for particular types of processing, such as x-ray or manual searching. Status indicators 16 may communicate between a user 14 and a management module 12 status information pertaining to the parameters of such processing and its progress. Management module 12 may then coordinate the processing of all the luggage booked on a particular departing flight to provide more effective security measures and to reduce the possibility of lost luggage.

Figure 2:
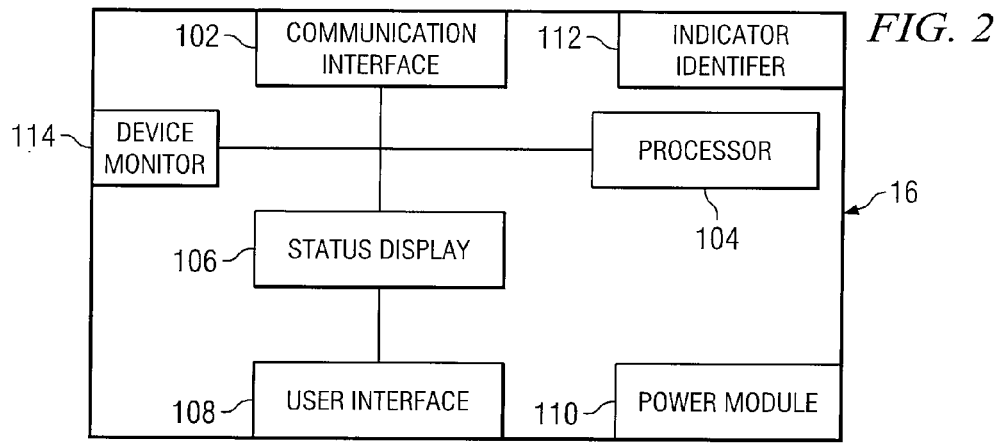
FIG. 2 illustrates a status indicator that may be utilized in particular embodiments of the inventory handling system.

FIG. 2 is a block diagram illustrating the functional contents of a particular embodiment of status indicator 16. As shown in FIG. 2, particular embodiments of status indicator 16 include a communication interface 102, a processor 104, a status display 106, and a user interface 108. Although FIG. 2 includes particular components that provide various aspects of the overall functionality of status indicator 16, alternative embodiments may include any appropriate combination of hardware and/or software to provide the functionality described with respect to FIG. 1.

Communication interface 102 transmits information to and receives information from appropriate components of inventory system 10, such as management module 12 or inventory station 50. In particular embodiments, communication interface 102 includes a wireless transmitter and a wireless receiver and/or a wireless transceiver capable of communicating with the appropriate components wirelessly. As a result, status indicator 16 may support wireless communication. Moreover, in particular embodiments, status indicator 16 may support wireless communication using 802.11, 802.15.4, ZigBee, Bluetooth, and/or other appropriate wireless communication protocols. More generally, communication interface 102 may include any appropriate hardware and/or software suitable to allow status indicator 16 to communicate with appropriate components of inventory system 10.

Processor 104 receives information transmitted by management module 12, inventory station 50, or other components of inventory system 10 through communication interface 102 and information input provided by user 14 through user interface 108. Based on the input provide by user 14, processor 104 communicates status information 46 to appropriate components of inventory system 10 through communication interface 102. Similarly, based on information received from management module 12, inventory station 50, or other components of inventory system 10 through communication interface 102, processor 104 instructs status display 106 to display status information 46 to user 14. Processor 104 may represent or include any form of processing component, including dedicated microprocessors, general purpose computers, or other processing devices capable of processing electronic information. Examples of processor 104 include microprocessors, digital signal processors (DSPs), application-specific integrated circuits (ASICs), field-programmable gate arrays (FPGAs), and any other suitable specific or general purpose processors.

Status display 106 display status information 46 to user 14 relating to a task to which status indicator 16 is associated. Status display 106 may represent any appropriate lights, display, screen, speakers, and/or other suitable components to provide user 14 a visual and/or audio indication of the status of the task associated with status indicator 16. Additionally, in particular embodiments, status display 106 may represent or include components of user interface 108. For example, in particular embodiments, status indicator 16 includes a lighted button that represents both status display 106 and user interface 108. In such embodiments, status indicator 16 may display status information to user 14 by lighting the lighted button to indicate, for example, that an inventory item 40 associated with status indicator 16 should be moved to the shipping pallet 34 that user 14 is creating. In addition, in particular embodiments, status indicator 16 may be associated with multi-iteration task and status display 106 may reflect the number of iterations remaining to be completed. For example, status indicator 16 may be associated with the task of moving a certain quantity of a particular inventory item 40 from a storage pallet 32 to a shipping pallet 34. In such embodiments, status display 106 may indicate the number of units of the inventory item 40 that remain to be transferred.

User interface 108 allows user 14 to input status information 46 to status indicator 16. User interface 108 may represent any appropriate buttons, keys, switches, microphones, and/or other suitable components to allow the user to input status information 46 to status indicator 16. Additionally, as noted above, user interface 108 may represent or include components of status display 106. For example, in particular embodiments, status indicator 16 includes a lighted button that represents both status display 106 and user interface 108. In such embodiments, user 14 may provide status information 46 to status indicator 16 by pressing the lighted button to indicate, for example, that user 14 has successfully moved an inventory item 40 of an appropriate type to the shipping pallet 34 that user 14 is creating.

Power module 110 provides power to the various components of status indicator 16 and/or couples status indicator 16 to a power source. Depending on the configuration of status indicator 16, power module 110 may represent or include batteries, solar cells, energy storage capacitors, a wireless power receiver, and/or any other appropriate components to provide power to status indicator 16 and/or to couple status indicator 16 to an appropriate power source. As one specific example, in particular embodiments, power module 110 includes a rechargeable battery with a recharging plug. In such embodiments, status indicator 16 may be stored in a charging cradle when not in use.

Indicator identifier 112 uniquely identifies status indicator 16 to distinguish status indicator 16 from other status indicators. In particular embodiments, indicator identifier 112 may represent a label bearing text (e.g., an alphanumeric value) or a graphic that is uniquely associated with status indicator 16. In alternative embodiments, indicator identifier 112 may represent a portion of status indicator 16 that is colored with a color uniquely assigned to status indicator 16. Moreover, in particular embodiments, indicator identifier 112 may represent an RFID or bar code to be read by an identifier reader 18. In general, however, indicator identifier 112 may include any appropriate component or components suitable to identify status indicator 16 and may be human-readable, machine-readable, and/or identify status indicator 16 in any appropriate manner. Additionally, in particular embodiments, status indicator 16 may include no fixed indicator identifier 112 and user 14 may provide similar information to status indicator 16 and/or management module 12 (e.g., by keying a value into status indicator 16 and communicating the value to management module 12).

Device monitor 114 conveys the state of status indicator 16 to users 14. This state may relate to the availability, current assignment, power level, repair state, and/or any other aspect of the operation of status indicator 16. Device monitor 114 may include light bulbs, light-emitting diodes (LEDs), liquid crystal displays (LCDs), 7-segment digital displays, speakers, and/or any appropriate combination of components suitable to provide this functionality. In particular embodiments, device monitor 114 may include or represent components of status display 106 or user interface 108. For example, in particular embodiments, device monitor 114 may include a lighted button that is activated to indicate the availability state of status indicator 16 when user 15 is attempting to assign status indicators 16 to a particular task. Once status indicator 16 is assigned to a particular task or object, the same lighted button may be then be used to exchange information between user 14 and management module 12 as part of the operation of status display 106 or user interface 108.

Figure 3A:
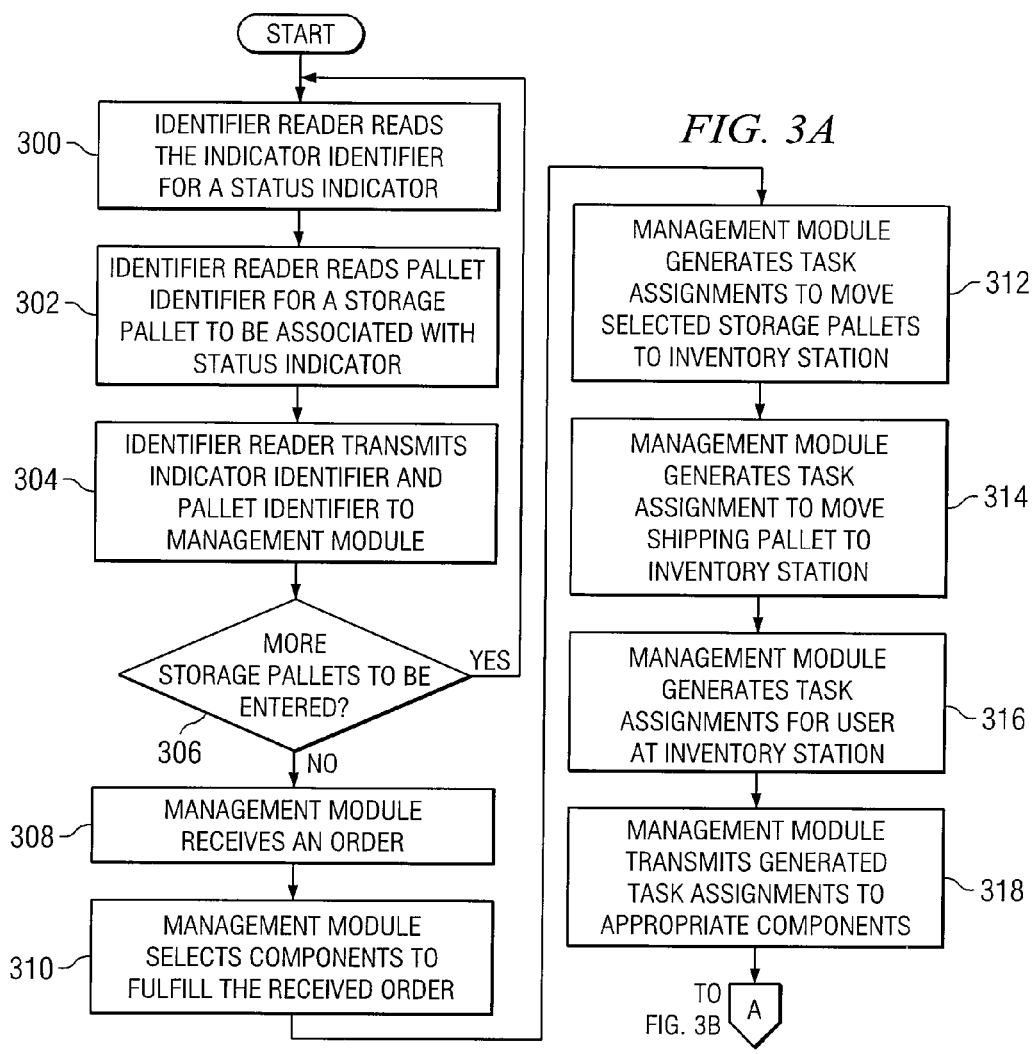
FIG. 3 illustrates example operation of a particular embodiment of the inventory handling system that utilizes status indicators.
Figure 3B:
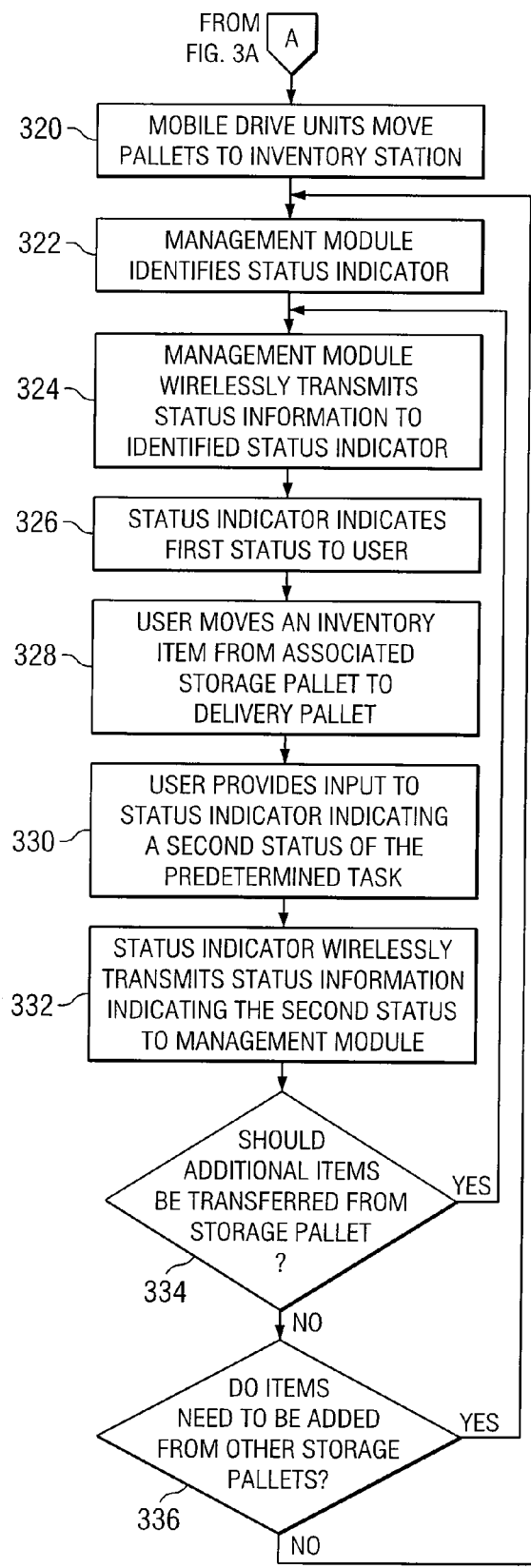
Figure 3B:
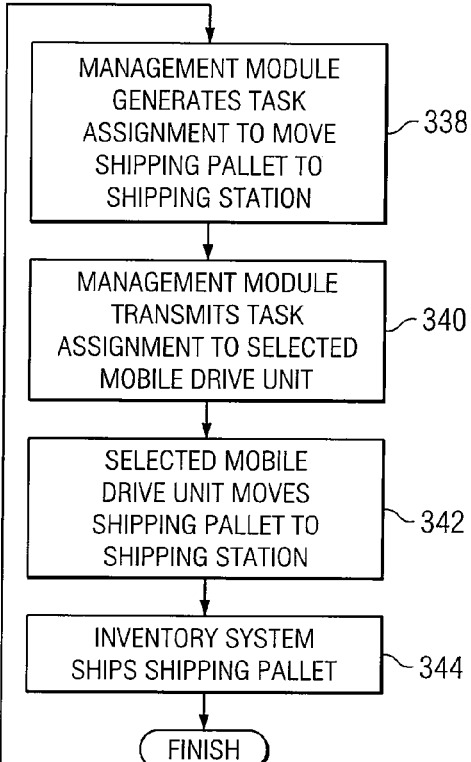

FIG. 3 is a flowchart illustrates one of how status indicators 16 may be utilized in a particular embodiment of inventory system 10. More specifically, FIG. 3 details one manner in which collection of status indicators 16 can be used to facilitate the communication of status information between user 14 and management module 12 as user 14 completes an ordered sequence of tasks. In general, the steps illustrated in FIG. 3 may be combined, modified, or deleted where appropriate, and additional steps may also be added to the example operation. Furthermore, the described steps may be performed in any suitable order without departing from the scope of the invention.

In this example, it is assumed that inventory system 10 includes a plurality of status indicators 16 that inventory system 10 associates with particular storage pallets 32 stored by inventory system 10. As a result, management module 12 can instruct user 14 as to the appropriate time to complete a predetermined task associated with a particular storage pallet 32 or the inventory items 40 stored by a particular storage pallet 32 by providing appropriate status information 46 to the associated status indicator 16. Similarly, user 14 can communicate status information 46 associated with the predetermined task back to management module 12 by providing appropriate input to the status indicator 16 associated with the relevant storage pallet 32.

Operation begins with inventory system 10 associating status indicators 16 with particular storage pallets 32. In the illustrated example, each status indicator 16 includes an indicator identifier that uniquely identifies its status indicator 16. Similarly, storage pallets 32 include a pallet identifier that uniquely identifies its storage pallet 32. As a result, an identifier reader 18 reads the indicator identifier for a particular status indicator 16 at step 300. Identifier reader 18 also reads the pallet identifier for a particular storage pallet 32 to be associated with the particular status indicator at step 302. Identifier reader 18 may read the identifiers in any manner appropriate for the type of identifiers utilized in inventory system 10. As one example, in particular embodiments, the identifiers represent bar codes, and identifier reader 18 may read the identifiers by scanning the bar codes. As another example, in particular embodiments, the identifiers represent RFID tags, and identifier reader 18 reads the identifiers by detecting radio-frequency information that is transmitted by the RFID and that identifies the corresponding status indicator 16 or storage pallet 32.

After reading the indicator identifier and pallet identifier for a status indicator 16 and storage pallet 32 to be associated with one another in inventory system 10, identifier reader 18 transmits the indicator identifier and pallet identifier to management module 12 at step 304. Management module 12 then associates the new storage pallet 32 and the selected status indicator 16 in memory. For example, management module 12 may maintain a database containing associations between all of the storage pallets 32 stored in inventory system 10, the inventory items 40 these storage pallets store, and the status indicators 16 assigned to these storage pallets 32. If more storage pallets 32 remain to be entered into inventory system 10, steps 300-304 may be repeated as shown in FIG. 3 at step 306.

Although FIG. 3 illustrates steps 300-306 occurring at a particular point within the illustrated example, inventory system 10 may, in particular embodiments, create new associations between storage pallets 32 and status indicators 16 or modify existing associations between storage pallets 32 and status indicators 16 at any suitable point during operation. For example, at any point during operation, inventory system 10 may receive a new storage pallet 32 for entry into inventory system 10 and, as part of entering the new storage pallet 32 in inventory system 10, a user 14 may select a status indicator 16 to be associated with the new storage pallet 32. User 14 may then read the indicator identifier for the selected status indicator 16 and the pallet identifier for the new storage pallet 32 and transmit information identifying the new storage pallet 32 and the selected status indicator 16 to management module 12. This process may then be repeated at various points during the operation of inventory system 10 as inventory system 10 receives additional new storage pallets 32.

In the illustrated example, operation continues at step 308 with management module 12 receiving an order 42 identifying specific inventory items 40 to be shipped to a particular destination. In response to the received order 42, management module 12, at step 310, selects components to fulfill the received order 42 including, in the illustrated example, one or more storage pallets 32 storing inventory items 40 requested by the received order 42, an inventory station 50 where all of the requested inventory items 40 can be transferred to a shipping pallet 34 for shipping, and mobile drive units 20 capable of moving the selected storage pallets 32 to the selected inventory station 50. Management module 12 then generates task assignments 44 identifying inventory holders 30 that support the selected storage pallets 32. Management module 12 may also generate a task assignment 44 identifying an inventory holder 30 that supports an empty shipping pallet 34 at step 314. Furthermore, management module 12 may also generate one or more task assignments 44 for a user 14 at the selected inventory station 50 to provide additional information to guide user 14 in creating a shipping pallet 32 to fulfill the received order 42 at step 316. User 14 may use information in this task assignment 44 to supplement status information 46 provided by status indicators 16 when completing tasks necessary to satisfy the received order 42. Management module 12 then transmits the generated task assignments 44 to the appropriate components at step 318.

At step 320, the selected mobile drive units 20 move inventory holders 30 supporting the selected storage pallets 32 and shipping pallet 34 to the selected inventory station 50. At step 322, management module 12 identifies, based on the associations management module 12 stored in memory, a first status indicator 16 associated with a storage pallet 32 storing a first inventory item 40 to be transferred to the selected shipping pallet 34. Management module 12 then wirelessly transmits status information 46 to the first status indicator 16 at step 324. This status information is associated with a predetermined task involving the storage pallet 32 such as, in this case, transferring an inventory item 40 from the first storage pallet 32 to the shipping pallet 34. Moreover, the status information 46 indicates a particular first status of the predetermined task. In this case, the status information 46 indicates that inventory system 10 is ready for user 14 to complete the predetermined task. The first status indicator 16 indicates this first status to user 14 at step 326.

User 14 may respond to the first status in any appropriate manner depending on the significance of the first status and the nature of the predetermined task. In this case, user 14 completes the predetermined task associated with the associated storage pallet 32 by moving one inventory item 40 from the associated storage pallet 32 to the shipping pallet 34 chosen for the received order 42 at step 328. At step 330, user 14 provides input to the first status indicator 16 indicating a second status of the predetermined task. In this case, the input indicates that user 14 has completed the predetermined task. The first status indicator 16 then wirelessly transmits information indicating the second status to management module 12 at step 332.

Management module 12 may respond to the information transmitted by the first status indicator in a variety of ways depending on the configuration of inventory system 10 and the specific order 42 being completed. For example, in particular embodiments, the status information 46 provided by management module 12 to the relevant status indicator 16 does not specify a number of inventory items 40 to be transferred from the associated storage pallet 32 to the shipping pallet 34, and management module 12 may instruct user 14 to transfer inventory items 40 one at a time. As a result, as shown in FIG. 3, in particular embodiments, management module 12 may determine whether additional inventory items 40 should be transferred from the first storage pallet 32 to shipping pallet 34 at step 334. If so, operation may return to step 324, with management module 12 transmitting additional status information to the first status indicator 16 and user 14 completing an additional iteration of the transferring task.

If no other inventory items 40 from the first storage pallet 32 need to be added to shipping pallet 34, management module 12 may, in particular embodiments, determine if other inventory items 40 still need to be added to the shipping pallet 34 to complete order 42 at step 336. If so, operation may return to step 322 and management module 12 may determine, based on the associations management module 12 has stored in memory, a status indicator 16 associated with a storage pallet 32 that is storing the additional inventory items 40.

Thus, management module 12 may utilize status indicators 16 to guide user 14 through an ordered sequence of tasks. For example, management module 12 may use status indicators 16 to control the order 42 in which user 14 places inventory items 40 on shipping pallet 34. This may allow management module 12 to control the weight distribution of shipping pallets 34 created by user 14 or to control the layering of inventory items 40 on shipping pallet 34 (e.g., to protect fragile inventory items 40).

If no other inventory items 40 need to be added to shipping pallet 34, management module 12 may then initiate other tasks that must be completed to fulfill the received order 42. For example, in response to receiving status information 46 from an appropriate status indicator 16 indicating that the last inventory item 40 has been transferred to shipping pallet 34, management module 12 may generates a task assignment 44 instructing the mobile drive unit 20 currently transporting shipping pallet 32 to move shipping pallet 34 to a shipping station at step 338. At step 340, management module 15 transmits the generated task assignment 44 to the selected mobile drive unit 20. The selected mobile drive unit 20 moves the loaded shipping pallet 34 to the shipping station at step 342.

At the shipping station, shipping pallet 34 may be wrapped or sealed, postage and a shipping label may be applied, and/or shipping pallet 34 may be prepared for shipping in other appropriate manner. At step 344, the shipping pallet 34 may then be shipped to a destination specified or associated with the received order 42. The operation of inventory system 10 with respect to fulfilling order 40 may then end as shown in FIG. 3.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for communicating information pertaining to a task, comprising:
receiving, by a status indicator, an instruction to indicate availability of the status indicator for a task, the status indicator comprising a portable device that includes an availability indicator and is capable of communicating with a remote device;
indicating, by the status indicator, availability of the status indicator for the task to a user by activating the availability indicator in response to receiving the instruction;
receiving, by the status indicator, a selection of the status indicator for the task from the user;
in response to receiving the selection for the task from the user:
transmitting wirelessly, by the status indicator, information identifying the status indicator to the remote device;
receiving wirelessly, by the status indicator, first status information using a wireless interface, wherein the first status information specifies a first status associated with the task;
indicating, by the status indicator, the first status to the user at an inventory station using a display;
receiving, by the status indicator, input from the user indicating a second status associated with the task; and
in response to receiving the input from the user, transmitting wirelessly, by the status indicator, second status information to the remote device, wherein the second status information specifies the second status, wherein the task is associated with an inventory holder transported to the inventory station from a remote location by a mobile drive unit, the mobile drive unit comprising a self-powered device operable to dock with the inventory holder at the remote location in response to receiving the task.

2. The method of claim 1, wherein receiving first status information from the remote device comprises receiving information instructing the user to begin the task.

3. The method of claim 1, receiving input from the user comprises receiving input from the user indicating that the user has completed the task.

4. The method of claim 1, wherein:
receiving wirelessly first status information comprises receiving first status information in accordance with at least one of a Bluetooth, an 802.11, an 802.15.4, and a ZigBee wireless communication standard; and
transmitting wirelessly second status information comprises transmitting second status information in accordance with at least one of a Bluetooth, an 802.11, an 802.15.4, and a ZigBee wireless communication standard.

5. The method of claim 1, further comprising, prior to receiving first status information, wirelessly transmitting information identifying a status indicator to the remote device.

6. The method of claim 1, wherein the task comprises a first task and the remote device comprises a management module operable to generate task assignments that describe tasks to be completed, and further comprising:
receiving second status information at the management module, and
in response to receiving second status information, generating a task assignment specifying a second task that is to be initiated after the user completes the first task.

7. The method of claim 6, wherein the first task comprises a first task to be completed by a first user and the second task comprises a second task to be completed by a second user.

8. The method of claim 6, wherein the first task comprises a first task to be completed at a first location and the second task comprises a second task to be completed at a second location.

9. The method of claim 1, wherein receiving first status information comprises:
associating, in a memory, each of a plurality of status indicators with one of a plurality of components;
identifying, based on information stored in the memory, a status indicator associated with a component involved in the task;
transmitting the first status information to the identified status indicator; and
receiving wirelessly the first status information at the identified status indicator.

10. The method of claim 9, wherein the status indicator includes an indicator identifier, and wherein associating, in the memory, the status indicator with the first task comprises:
reading the indicator identifier;
transmitting the indicator identifier to a management module; and
storing the indicator identifier at the management module.

11. The method of claim 10, wherein the indicator identifier comprises a bar code and wherein reading the indicator identifier comprises scanning the bar code.

12. The method of claim 10, wherein the indicator identifier comprises a radio frequency identification (RFID) tag and wherein reading the indicator identifier comprises receiving radio frequency information identifying the status indicator from the RFID tag.

13. The method of claim 1, wherein receiving first status information comprises:
receiving information identifying a first status indicator from a plurality of status indicators;
receiving information specifying a state of the first status indicator;
rejecting the status indicator based on the state of the first status indicator;
in response to rejecting the status indicator, prompting a user to identify a second status indicator from the plurality of status indicators.

14. The method of claim 13, wherein receiving information specifying a state of the first status indicator comprises receiving information indicating an energy level of the first status indicator.

15. The method of claim 13, wherein receiving information specifying a state of the first status indicator comprises receiving information indicating whether the first status indicator is currently assigned to a task.

16. The method of claim 13, wherein receiving information specifying a state of the first status indicator comprises receiving information indicating a status of a task currently assigned to the first status indicator.

17. The method of claim 1, wherein indicating the first status to the user comprises activating a light.

18. The method of claim 1, wherein receiving input from the user comprises detecting that the user has pressed a button.

19. The method of claim 1, wherein receiving input from the user comprises activating a lighted button, and wherein receiving input from the user comprises detecting that the user has pressed the lighted button.

20. An apparatus for communicating information pertaining to a task, comprising:
a wireless interface operable to receive and transmit information wirelessly;
a user interface operable to receive input from a user at an inventory station relating to a task;
a display; and
a processor operable to:
receive an instruction to indicate availability of the apparatus for the task, the apparatus comprising a portable device that includes an availability indicator and is capable of communicating with a remote device;
indicate availability of the apparatus for the task to the user by activating the availability indicator in response to receiving the instruction;
receive a selection for the task from the user;
in response to receiving the selection for the task from the user:
transmit wirelessly information identifying the apparatus to the remote device;
receive first status information through the wireless interface, wherein the first status information specifies a first status associated with the task;
indicate the first status to the user using the display;
receive input from the user indicating a second status associated with the task; and
in response to receiving the input, transmit second status information to the remote device through the wireless interface, wherein the second status information specifies the second status, wherein the task is associated with an inventory holder transported to the inventory station from a remote location by a mobile drive unit, the mobile drive unit comprising a self-powered device operable to dock with the inventory holder at the remote location in response to receiving the task.

21. The apparatus of claim 20, wherein the first status information comprises information instructing the user to begin the task.

22. The apparatus of claim 20, wherein the processor is operable to receive input from the user indicating the second status by receiving input from the user indicating that the user has completed the task.

23. The apparatus of claim 20, wherein the wireless interface is operable to receive and transmit information in accordance with at least one of a Bluetooth, an 802.11, an 802.15.4, and a ZigBee wireless communication standard.

24. The apparatus of claim 20, wherein the processor is further operable to transmit information identifying the apparatus through the wireless interface prior to receiving the first status information.

25. The apparatus of claim 20, wherein the apparatus includes an indicator identifier that identifies the apparatus.

26. The apparatus of claim 25, wherein the indicator identifier comprises a bar code.

27. The apparatus of claim 25, wherein the indicator identifier comprises a radio frequency identification (RFID) tag.

28. The apparatus of claim 25, wherein the indicator identifier displays an alphanumeric value that uniquely identifies the apparatus.

29. The apparatus of claim 25, wherein the indicator identifier comprises a colored portion that is colored a color uniquely associated with the apparatus.

30. The apparatus of claim 20, wherein the display comprises a light and wherein the processor is operable to indicate the first status to the user by activating the light.

31. The apparatus of claim 20, wherein the user interface comprises a button, and wherein the processor is operable to receive input from the user by detecting that the user has pressed the button.

32. The apparatus of claim 20, wherein receiving input from the user comprises activating a lighted button, and wherein receiving input from the user comprises detecting that the user has pressed the lighted button.

33. A system for completing tasks, comprising;
a management module operable to wirelessly transmit status information to and wirelessly receive status information from a plurality of status indicators; and
the plurality of status indicators including a first status indicator, the first status indicator operable to:
receive an instruction to indicate availability of the first status indicator for a task, the first status indicator comprising a portable device that includes an availability indicator and is capable of communicating with a remote device;

indicate availability of the first status indicator for the task to a user by activating the availability indicator in response to receiving the instruction;

receive a selection for the task from the user;

in response to receiving the selection for the task from the user:

transmit wirelessly information identifying the first status indicator to the management module;

wirelessly receive first status information from the management module, wherein the first status information specifies a first status associated with a task;

indicate the first status to the user at an inventory station;

receive input from the user indicating a second status associated with the task; and in response to receiving the input, wirelessly transmit second status information to the management module, wherein the second status information specifies the second status, wherein the task is associated with an inventory holder transported to the inventory station from a remote location by a mobile drive unit, the mobile drive unit comprising a self-powered device operable to dock with the inventory holder at the remote location in response to receiving the task.

34. The system of claim 33, wherein the first status indicator is operable to receive first status information from the remote device by receiving information instructing the user to begin the task.

35. The system of claim 33, wherein the first status indicator is operable to receive input from the user by receiving input from the user indicating that the user has completed the task.

36. The system of claim 33, wherein the first status indicator is operable to:

wirelessly receive first status information by receiving first status information in accordance with at least one of a Bluetooth, an 802.11, an 802.15.4, and a ZigBee wireless communication standard; and wirelessly transmit second status information by transmitting second status information in accordance with at least one of a Bluetooth, an 802.11, an 802.15.4, and a ZigBee wireless communication standard.

37. The system of claim 33, wherein the task comprises a first task and the management module is further operable to;

receive second status information from the status indicator; and in response to receiving the second status information, generate a task assignment specifying a second task that is to be initiated after the user completes the first task.

38. The system of claim 33, wherein the management module comprises a memory, and wherein the management module is further operable to:

associate, in the memory, each of the status indicators with one of a plurality of components;

identify, based on information stored in the memory, a status indicator associated with a component involved in the task; and transmit the first status information to the identified status indicator.

39. The system of claim 38, wherein each of the plurality of status indicators includes an indicator identifier, and wherein the management module is operable to associate each of the status indicators with one of a plurality of components by:

receiving information from the indicator identifier; and associating the received information with the status indicator in the memory.

40. The system of claim 39, wherein each of the indicator identifiers comprises a bar code, and further comprising a bar code reader operable to:

scan a bar code; and transmit the bar code to the management module.

41. The system of claim 39, wherein each of the indicator identifiers comprises a radio frequency identification (RFID) tag, and further comprising a radio frequency (RF) scanner operable to:

receive radio frequency information identifying the status indicator from the RFID tag; and transmit information identifying the status indicator to the management module.

42. The system of claim 33, wherein each of the indicator identifiers displays an alphanumeric value that uniquely identifies that status indicator.

43. The system of claim 33, wherein each of the indicator identifiers comprises a colored portion and each of the colored portions is colored a different color.

44. The system of claim 33, wherein each status indicator comprises a light, and each status indicator is operable to indicate the first status to the user by activating the light.

45. The system of claim 33, wherein each status indicator comprises a button, and wherein each status indicator is operable to receive input from the user by detecting that the user has pressed the button.

46. The system of claim 33, wherein each status indicator comprises a lighted button, and wherein each status indicator is operable to receive input from the receiving input from the user comprises activating a lighted button and wherein receiving input from the user comprises detecting that the user has pressed the lighted button.

47. A system for communicating information pertaining to a task, comprising:

means for receiving an instruction to indicate an availability of a status indicator for a task, the status indicator comprising a portable device that includes an availability indicator and is capable of communicating with a remote device;

means for indicating availability of the status indicator for the task to a user by activating the availability indicator in response to receiving the instruction;

means for receiving a selection of the status indicator for the task from the user;

in response to receiving the selection for the task from the user:

means for wirelessly transmitting information identifying the status indicator to the remote device;

means for wirelessly receiving first status information, wherein the first status information specifies a first status associated with the task;

means for indicating the first status to the user at an inventory station;

means for receiving input from the user indicating a second status associated with the task; and means for wirelessly transmitting second status information to the remote device in response to receiving the input from the user, wherein the second status information specifies the second status, wherein the task is associated with an inventory holder transported from a remote location to the inventory station by a mobile drive unit, the mobile drive unit comprising a self-powered device operable to dock with the inventory holder at the remote location in response to receiving the task.

* * * * *